April 7, 1925.
A. J. A ÓTTESÉN
1,532,931
PROCESS FOR THE DIRECT COOLING OF GOODS
Filed Dec. 27, 1920
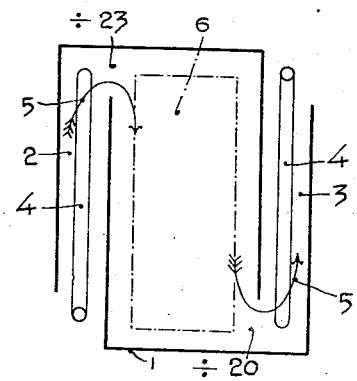
Inventor Patented Apr. 7, 1925.

1,532,931

UNITED STATES PATENT OFFICE.

ANTON JENSÉNIUS ANDREAS OTTESÉN, OF COPENHAGEN, DENMARK.

PROCESS FOR THE DIRECT COOLING OF GOODS.

Application filed December 27, 1920. Serial No. 433,408.

*To all whom it may concern:*

Be it known that I, ANTON JENSÉNIUS ANDREAS OTTESÉN, subject of the King of Denmark, residing at No. 14, Dosseringen, Copenhagen, in the Kingdom of Denmark, have invented certain new and useful Improvements in Processes for Direct Cooling of Goods, of which the following is a specification.

My invention concerns the refrigerating or freezing of food commodities such as meat, fish, fruits or similar goods through the direct treatment with a refrigerating liquid.

For the direct refrigerating or freezing of goods as hitherto carried out a strong salt solution is employed, and in order to avoid penetration of the salt into the goods, the salt-solution, during the treatment, must as far as possible be cooled down to its freezing point. Consequently, for avoiding a critical elevation of the temperature of the solution during its contact with the goods, it is necessary to employ a relatively great quantity of the former to a relatively small quantity of the latter thereby reducing the capacity of the refrigerating plant in a corresponding degree. Moreover, the salt solution must be intensively cooled at the cooling coils or similar cooling surfaces, whereby the formation of ice on the cooling surfaces is often caused and thus the work of the plant is troubled. However, still when fulfilling the most suitable conditions, the necessary constant lowness of the temperature of the salt solution near its freezing point during the treatment of the goods, is not yet ensured, and furthermore, even when a penetration of salt into the tissues of the goods essentially is avoided, however, it is in many cases difficult to avoid that the strong salt-solution injuring the surfaces of the goods, specially the sectional surfaces of the goods, through discolouring or otherwise.

In the technical literature it has also been proposed for the direct refrigerating or freezing of goods to employ, as refrigerating liquid, a solution of organic matter especially alcohol. However, the common alcohols such as spirit are not at all suitable for the direct treatment of food commodities owing to their detrimental effect on the smell and taste, and even on the structure of the goods. Other alcohols such as glycerine do not offer these drawbacks, but on the other hand their capacity of lowering the freezing point is rather insignificant. Thus, in a solution of glycerine of a strength which in itself might be suitable for practical use, such as a strength of 20% glycerine, the freezing point is only depressed to 4 centigrades below zero, and this temperature would be quite insufficient for the freezing processes in question. The employment of a greater percentage e. g. 40% would be expensive and furthermore at such a great content of glycerine the liquid would be too viscous to be circulated. Therefore, no proposal of this kind has every been utilized in practice.

Now, the object of my invention is to avoid the entrance of foreign substances specially salt into the goods and the injury of the sectional surfaces, at the same time as the refrigerating or freezing of the goods is executed only by means of a relatively small quantity of the refrigerating liquid, and in a relatively short time, in an economical manner and in simple plants.

Thus, according to my invention it is not necessary to cool the liquid down to its freezing point (which for instance may be between 20 and 30 centigrades below zero) and consequently, during the refrigerating or freezing of the goods, a considerable elevation or variation of the temperature of the liquid for instance a variation of 3 to 5 full centigrades or more is permitted without damage, the osmotical effect being avoided in such a degree that according to my experiences salt cannot penetrate even into fluids such as milk, or pure water poured directly into the cold liquid, but the said fluids are directly frozen to ice.

According to my invention this result is obtained thereby that instead of a refrigerating liquid which contains either an inorganic salt or a soluble organic matter such as alcohol or the like there is employed a combined or mixed refrigerating liquid which besides the salt, preferably common salt, contains an organic matter e. g. glycerine, carbohydrate, or the like.

By the employment of such a combined solution e. g. a glycerine-salt-solution for the direct refrigerating or freezing of the goods, according to my experiences, not only the secondary effects setting in when the goods are directly exposed to the strong salt solution, are counteracted—as well with regard to the osmotical effect as to the effect on the surface—but also the work of the refrigerating plant is improved and its freezing capacity is increased as the combined liquid if desirable may be cooled down to a relatively low temperature without ice formation. Thus, I have observed, that certain organic matter when present in a solution of salt, have an essential greater capacity of lowering the freezing point than when they are mixed with water only. If for instance a certain percentage of the organic matter is able to lower the freezing point of water from 0 to 4 centigrades below zero, the same percentage of the matter dissolved in a salt solution, lowers the freezing point from for instance a temperature between 5 and 20 centigrades below zero to a temperature between 22 and 27 centigrades below zero.

An arrangement suitable for carrying out the invention is diagrammatically shown on the drawing in a plan view.

In carrying out my invention into practice for refrigerating meat, fish or the like, I employ a combined or mixed cooling liquid obtained by way of example, by adding, say 5–10%, even 20% or more of glycerine to a solution of common salt, containing for instance, 15% or more of salt, or being even a concentrated salt-solution. This liquid is led into a container 1 and in a canal or canals 2 and 3 communicating with the container and having suitable cooling surfaces 4. Through a pump or circulating device of ordinary kind, not shown on the drawing, the liquid is brought to circulate in the direction as indicated by the arrows 5. In the canal 2 the liquid is cooled down to a temperature from 2 to 7 centigrades below the freezing point of the salt-solution proper. When the liquid enters the container 1 its temperature may be for instance 23 centigrades, as indicated upon the drawing. The goods to be refrigerated or frozen are placed in the liquid in the container 1 as shown with dotted lines 6, and if desired kept moving by known means, thus are directly exposed to the liquid of this relatively very low temperature. Hereby the liquid will absorb heat from the goods and may as a consequence, when entering the canal 3, have a higher temperature, than the above mentioned for instance, of about 20 centigrades as indicated upon the drawing, or a temperature much below the freezing point of the glycerine solution proper and preferably also below the freezing point of the salt solution proper.

In the canal 3 the heat absorbed from the goods is given off to the cooling surfaces 4, and thus the liquid resuming a temperature of about 23 centigrades may again be brought into contact with the goods in the container 1 or in another container.

Wherever the limitation "brine" is employed it is intended to designate a solution formed of such salt as sodium chloride or saltpeter or a combination of both sodium chloride and saltpeter.

Some form of carbohydrate such as sugar may be employed with the glycerine in the brine when desired.

The goods to be refrigerated or frozen, are preferably, when brought into contact with the liquid, in a moist or moistened state. After their refrigeration or freezing they are preferably washed in pure water or the like, and thus they glaze themselves automatically with an ice-coating owing to their content of cold.

I am aware, that a solution of chloride of calcium and alcohol is known as uncongelable conducting medium for circulating in tube-systems by the indirect freezing, but I believe that a combined liquid containing both salt, preferably common salt, and organic matter, preferably glycerine, previously neither has been employed nor proposed to be employed for the direct refrigerating or freezing of food commodities or similar goods, thus enabling the advantages above set forth to be obtained and the drawbacks of the hitherto known direct refrigerating processes to be removed.

I do not confine myself to employ the kind of refrigerating plant, shown on the drawing, nor to the temperatures mentioned, nor to the employment even of common salt and glycerine; if desirable the refrigerating liquid may contain more than one salt, for instance both saltpeter and common salt, and more than one organic matter, for instance both carbohydrate and glycerine.

I claim:

1. A process for refrigerating or freezing goods which comprises subjecting the goods to the direct action of a liquid comprising cool brine and glycerine.

2. A process for refrigerating or freezing goods by direct treatment with a cooling liquid consisting in cooling a solution of brine and glycerine down to a temperature below the freezing point of the salt-solution and subjecting the goods to the direct action of said cooled solution.

3. A process for refrigerating or freezing goods by direct treatment with a cooling liquid, consisting in subjecting the goods to the direct action of a solution of salt and glycerine, cooling the said liquid below the freezing point of the salt solution and without the formation of ice, and maintaining the said solution below said point during its absorption of heat from the goods.

4. The herein described process for refrigerating or freezing of goods, consisting in cooling a solution of salt and glycerine below the freezing point of the salt solution and after its temperature has been raised by the heat of the goods, recooling the solution below said point for subsequent use.

5. A process for refrigerating or freezing goods by direct treatment with a cooling liquid, which comprises subjecting the goods to the direct action of a solution containing sodium chloride, saltpeter and glycerine.

In testimony whereof I affix my signature in presence of two witnesses.

ANTON JENSÉNIUS ANDREAS OTTESÉN.

Witnesses:
A. CHRISTOFFERSEN,
IRVIN ZEAL.